(12) United States Patent
Sunden

(10) Patent No.: US 10,415,898 B1
(45) Date of Patent: Sep. 17, 2019

(54) LIQUID-COOLED FUSED FILAMENT FABRICATION NOZZLE

(71) Applicant: AREVO, INC., Santa Clara, CA (US)

(72) Inventor: Erik Sunden, San Francisco, CA (US)

(73) Assignee: Arevo, Inc., Milpitas, CA (US)

( * ) Notice: Subject to any disclaimer, the term of this patent is extended or adjusted under 35 U.S.C. 154(b) by 0 days.

(21) Appl. No.: 16/001,287

(22) Filed: Jun. 6, 2018

(51) Int. Cl.
| | | |
|---|---|---|
| *F28D 15/00* | (2006.01) | |
| *F28F 7/02* | (2006.01) | |
| *F28D 7/00* | (2006.01) | |
| *B33Y 80/00* | (2015.01) | |
| *B33Y 70/00* | (2015.01) | |
| *B33Y 10/00* | (2015.01) | |
| *B22F 3/105* | (2006.01) | |

(52) U.S. Cl.
CPC ............... *F28F 7/02* (2013.01); *B33Y 70/00* (2014.12); *B33Y 80/00* (2014.12); *F28D 7/0008* (2013.01); *B22F 3/1055* (2013.01); *B22F 2301/052* (2013.01); *B33Y 10/00* (2014.12); *F28F 2255/18* (2013.01)

(58) Field of Classification Search
CPC ....... F28F 7/02; F28F 2255/18; F28D 7/0008; B33Y 80/10; B33Y 70/10; B33Y 10/00; B22F 3/1055; B22F 2301/052; B29C 45/27; B29C 45/2725

USPC .................................................. 165/104.19
See application file for complete search history.

(56) References Cited

U.S. PATENT DOCUMENTS

| | | | |
|---|---|---|---|
| 6,168,414 B1 * | 1/2001 | Oas .................. | B29C 49/58 264/28 |
| 2006/0065425 A1 * | 3/2006 | Byerly .............. | B05C 5/02 174/71 R |
| 2012/0187610 A1 * | 7/2012 | Chen ................ | B29C 45/27 264/535 |
| 2012/0231108 A1 * | 9/2012 | Wernz .............. | B29C 45/2725 425/547 |

* cited by examiner

*Primary Examiner* — Davis D Hwu
(74) *Attorney, Agent, or Firm* — Botos Churchill IP Law LLP

(57) ABSTRACT

The present invention provides an integral cooling system within an FFF nozzle manifold. The system includes a cooling reservoir formed within the body of the nozzle manifold, adapted to circulate a cooling liquid around the filament chamber and nozzle orifice. The coolant channel is situated to be in close physical proximity to the chamber and orifice, and to be thermally coupled to both via the body of the nozzle manifold. In addition, the interior of the cooling chamber is constructed so as to maximize the available surface area within a given cross-sectional geometry, thereby promoting increase heat transfer between the nozzle manifold and the cooling liquid.

19 Claims, 4 Drawing Sheets

LIQUID-COOLED FUSED FILAMENT FABRICATION NOZZLE

FIELD OF THE INVENTION

The present invention relates generally to fused filament fabrication, and more specifically to the cooling of nozzles employed in such fabrication processes.

BACKGROUND OF THE INVENTION

The additive manufacturing process is widely known as "3D printing." Numerous 3D-printing methodologies have been described in prior art, the most common being solid-laser sintering (SLS), stereolithography (SLA), and extrusion-based 3D printing or fused filament fabrication (FFF).

All of these methods involve depositing a thin layer of thermoplastic or thermoset materials. In FFF, thin strands of material (referred to herein as "extrudate") are deposited from a deposition nozzle onto a build surface. As the filament moves through the FFF system, it undergoes mechanical, chemical, and thermal changes. Deposition proceeds in a controlled pattern on the build surface to construct a 3D object.

In operation of an FFF system, a filament of material is fed into a nozzle manifold via a motorized feed system from a supply spool. This spooled material is typically at room temperature in a solid state. Typically, the filament moves through the manifold into a cooling block, and then a heating block. As the filament moves through the heating block, it is heated above a melting temperature. Once melted, the polymer is in a completely liquid, free-flowing state and exits the nozzle.

Once the liquefied polymer (extrudate) reaches the build surface (or is deposited on already-deposited layers of extrudate), it cools below its crystallization temperature. If the build chamber and build platform are maintained at the appropriate temperature, the polymer chains in the extrudate begin to order and align before completely solidifying. Once the build is complete, the polymer cools down to room temperature.

The thermal management of the filament throughout the FFF process is critical for building, in a consistent and predictable fashion, 3D objects. The management of and interplay between the cooling and heating blocks must be tightly controlled to ensure proper deposition, cooling and solidification of the build. For example, it is clear that the heating block must be maintained above the processing or melt temperature of the polymer for the filament to melt and extrude through a small orifice (e.g., diameter between about 0.1 to 0.5 mm) in the nozzle. Furthermore, the temperature in the cooling block, which would otherwise rise due to heat conducted thereto from the heating block, must be kept below the processing/melt temperature.

The prior art provided for controlling the temperature of the cooling block using a fan that is attached directly to the cooling block, or by circulating a cooling liquid around the cooling block or nozzle manifold. This removes heat from the cooling block and is able to keep the temperature in the cooling block below processing/melt temperature of the polymer feed.

The ability to provide this critical temperature control becomes particularly difficult when high-temperature polymers such as polyether ether ketone (PEEK), polyamide-imine (PAI) and self-reinforced polyphenylene (SRP) are being processed for deposition. The cooling block must be capable of removing significant amounts of thermal energy from the nozzle manifold in a very controlled manner. A need therefore exists for a system and method to provide such reliable, controllable and efficient means to cool an FFF nozzle manifold adapted to deposit high-temperature polymers such as PEEK, PAI, and SRP.

BRIEF SUMMARY OF THE INVENTION

The present invention provides an integral cooling system within an FFF nozzle manifold. The system includes a coolant channel formed within the body of the nozzle manifold, adapted to circulate a cooling liquid around the filament chamber and nozzle orifice. The coolant channel is situated to be in close physical proximity to the chamber and orifice, and to be thermally coupled to both via the body of the nozzle manifold. This close proximity permits the focusing of thermal action of the coolant channel, thereby creating a significant thermal gradient within the filament channel. This gradient results in a sharp thermal break between the solid and liquid phase of the filament traveling through the channel; a condition that is known to lessen filament clogging and contribute to the consistent and controlled operation of an FFF system. In addition, the interior of the cooling channel is constructed so as to maximize the available surface area within a given cross-sectional geometry, thereby promoting increase heat transfer between the nozzle manifold and the cooling liquid.

DESCRIPTION OF THE DRAWINGS

The features, aspects, and advantages of the present invention will become better understood with regard to the following description, appended claims, and accompanying drawings in which:

DETAILED DESCRIPTION

Figures 1A, 1B:
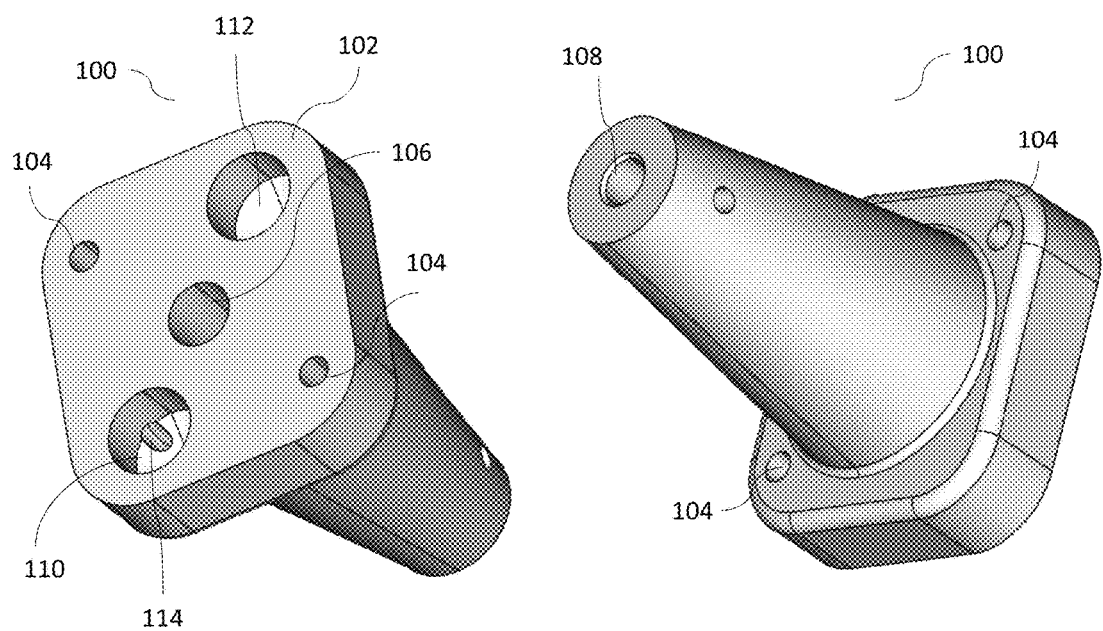
FIG. 1A is a top perspective view of an extrusion nozzle manifold according to one embodiment of the present disclosure.
FIG. 1B is a bottom perspective view of the extrusion nozzle manifold of FIG. 1A.

FIGS. 1A, 1B, 1C and 1D depict an exemplary embodiment of an extrusion nozzle manifold according to one embodiment of the present disclosure. As illustrated, the manifold 100 has a planar upper surface 102 facilitating attachment to an extrusion system. Mounting holes 104 are provided to accept fasteners (not illustrated) for securing the manifold to the extrusion system. A central filament channel 106 is located within the manifold. The top of central filament channel 106 is adapted to accept the input of a filament, and nozzle aperture 108 is formed at its bottom.

In a preferred embodiment of the invention, extrusion nozzle manifold 100 is manufactured from powdered aluminum using a direct metal laser sintering ("DMLS") 3D printing process. Although aluminum powder was utilized in a preferred embodiment, several other metals such as stainless steel and titanium, as well as nickel and chromium alloys, can also be utilized in the DMLS process. The particular material employed is primarily a design choice based upon variables such as thermal conductivity (good thermal conductivity being critical to the functionality of the manifold), a material's coefficient of thermal expansion, and cost. The DMLS process for creating complex 3D metal objects was first commercialized in the early 1990's, and has been in wide-spread commercial use since at least 2002. Consequently, the process will not be discussed in detail in this description.

Figure 1C:
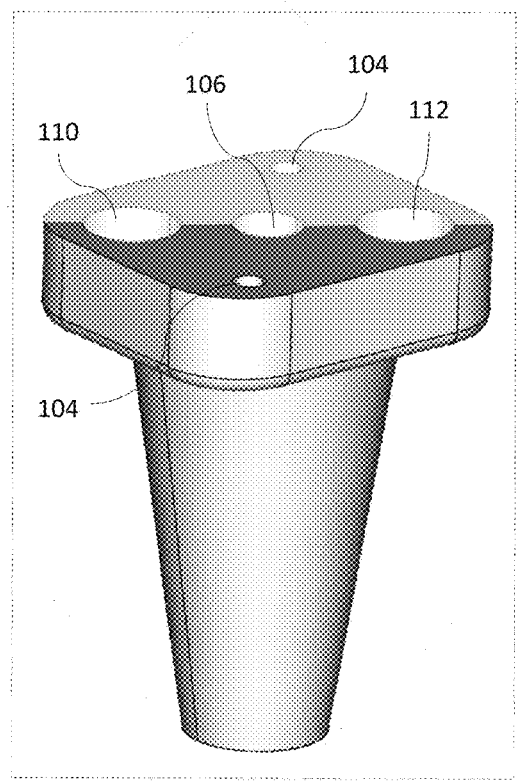
FIG. 1C is a cross-sectional view of the extrusion nozzle manifold FIG. 1A.
Figure 1D:
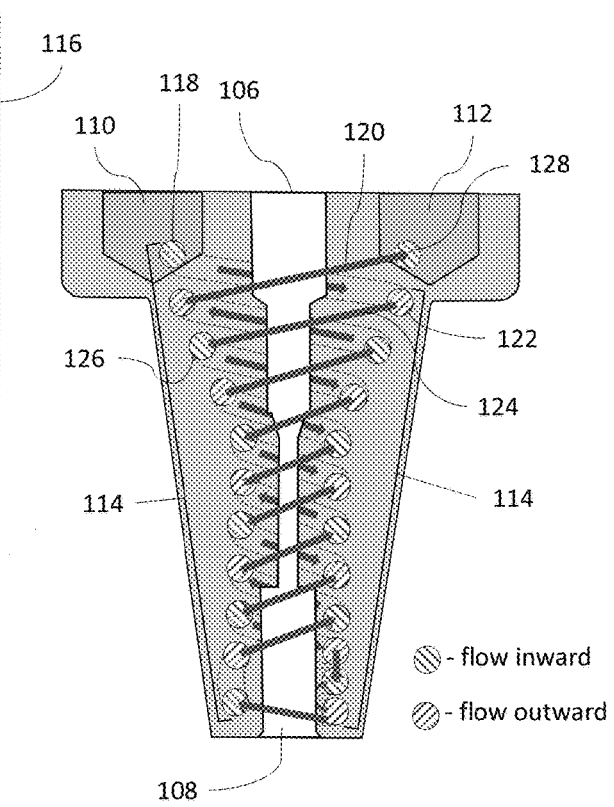
FIG. 1D is a view showing the plane of the cross-sectional view of FIG. 1C.

The extrusion nozzle manifold 100 also includes a coolant input conduit 110, and a coolant return conduit 112. Coolant input conduit 110 is connected to coolant return conduit 112 by coolant channel 114. Coolant channel 114 is provides a closed channel between coolant input conduit 110 and a coolant return conduit 112. In a preferred embodiment of the invention, this coolant channel is of the form of a double-helix. FIG. 1C provides an illustration of extrusion nozzle manifold 100 with plane 116 super-imposed upon it. FIG. 1D provides a cross-sectional view, along plane 116, of extruder nozzle manifold 100. One of the benefits of employing DMLS to create extrusion nozzle manifold 100, is the ability to form complex internal structures such as double-helix coolant channel 114. Such a channel would be wholly impractical to machine into a unitary block of aluminum of other metal; furthermore, the tolerances and construction processes required to assemble a similarly configured manifold from multiple, independently machined components would present significant technological and financial impediments. In addition, the dimensional tolerances and complex three-dimensional patterns that the DMLS fabrication process can support permits the coolant channel 114 to be fabricated in very close proximity to filament channel 106 and nozzle aperture 108. This maximizes the thermal coupling between the coolant channel and the filament channel 106 and nozzle aperture 108 (and any extrudate contained therein). The increased thermal coupling serves to focus the thermal action of the coolant channel and create a significant thermal gradient within the filament channel. This gradient results in a sharp thermal break between the solid and liquid phase of the filament traveling through the channel; a condition that is known to lessen filament clogging and contribute to the consistent and controlled operation of an FFF system.

This cross-sectional view shows the helical nature of coolant channel 114. Coolant entering coolant input conduit 110 would come into coolant channel 114 via inlet 118, flowing into channel section 120 and traveling behind and around central filament channel 106. The coolant would then follow coolant channel 114, flowing outward from plane 116 (see flow indicator 122) and into a portion of coolant channel 114 that is cut-away in the present view (represented by arrow 124). The coolant would continue through coolant channel 114, going repeatedly around central filament channel 106 as it flowed downward toward 108 and back up toward 112 (see arrows in FIG. 1D). The coolant would flow into coolant return conduit 112 via inlet 128 (depicted with dashed lines as it is in a portion of coolant return conduit 112 that is cut-away in the view provided by FIG. 1D).

Figure 2:
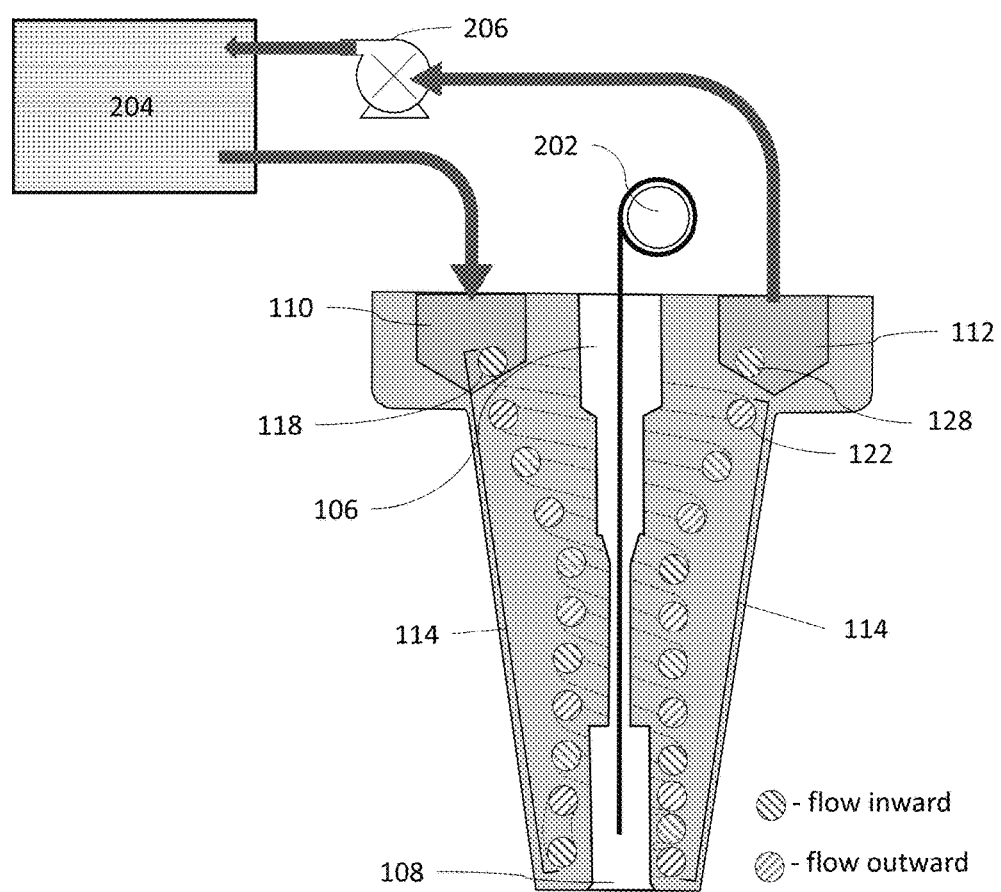
FIG. 2 is a schematic representation of the extrusion nozzle manifold of FIG. 1A coupled to an extrusion system.

When mated to an extrusion system, extrusion nozzle manifold 100 is aligned with a filament delivery system 202, as schematically illustrated in FIG. 2. In addition, a closed-loop for the circulation of coolant is established between manifold 100 and heat exchanger 204. In preferred embodiment, circulation of the coolant within this closed-loop is driven by a pump 306, which draws heated coolant though a coupling to coolant return conduit 112. Pump 206 then drives the heated coolant through heat exchanger 304, where the coolant temperature is reduced via passive or active cooling. The reduced-temperature coolant is then returned to extrusion nozzle manifold 100, via a coupling to coolant input conduit 110, and recirculated through coolant channel 114.

In most conventional heat exchanging systems, the ability to collect or dissipate heat is a function of surface area, thermal conductivity and the temperature differential between the source and the sink. The instant invention provides for increased surface area within coolant channel 114 as a direct consequence of the DMLS manufacturing process. DMLS constructs three-dimensional objects by sintering a thin layer of metal particles with a directed laser. As the particles are sintered by the laser's heat, they coalesce to form a thin, almost 2D layer of the 3D object being formed. With successive applications of metal particles and successive passes by the directed laser, the 3D object is built-up from these "2D" layers. Due to the variations in the such things as the precise arrangement of the metal particles, and slight, unregulated variations in the manner in which the laser's radiation is absorbed, the edges of each successive "2D" layer cannot be precisely controlled. This is sometimes seen as a limitation of the DMLS process, requiring the sanding, filing or polishing of the resultant 3D surface so as to minimize any ridges, or other surface variations, and thereby produce a smooth or shiny surface.

Figure 3:
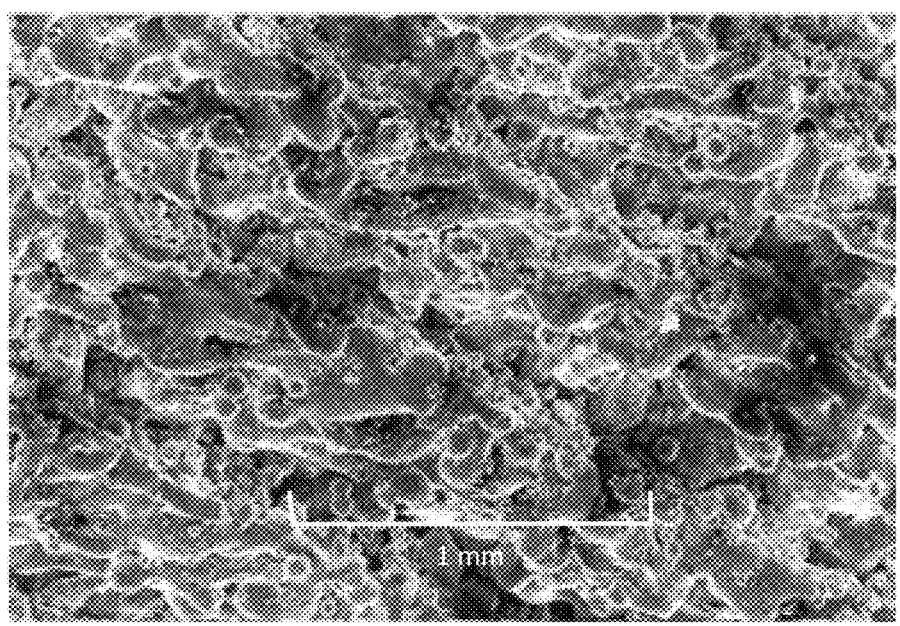
FIG. 3 is a photomicrograph of the type of surface features typically found upon DMLS-fabricated aluminum objects such as the extrusion nozzle manifold of FIG. 1A.

However, this so-called limitation provides an advantage with respect to the present invention. DMLS fabrication produces an uneven, textured surface on the interior wall of coolant channel 114. These surface variations are minimal enough so as not to present any measurable impediment to the flow of coolant within the channel, but they do serve to greatly increase the effective surface area of that channel. The flowing coolant, a solution of propylene glycol and distilled water in a preferred embodiment of the invention, surrounds these surface features, permitting a greater amount of heat to be transferred from extrusion nozzle manifold 100, than would have been achievable for a channel of the same diameter with a completely smooth interior surface. A photomicrograph of the type of surface features typically found upon DMLS-fabricated aluminum objects are provided in FIG. 3.

Although the invention herein has been described with reference to particular embodiments, it is to be understood that these embodiments are merely illustrative of the principles and applications of the present invention. For example, the invention is not limited to a single coolant channel within a manifold. Multiple channels could be fabricated, each of which could support the flow of a particular coolant. These separate coolant channels could each be associated with separate heat exchanging systems, or a common system could be employed. It is therefore to be understood that numerous modifications may be made to the illustrative embodiments and that other arrangements may be devised without departing from the spirit and scope of the present invention as defined by the appended claims.

What is claimed is:

1. An extrusion nozzle manifold comprising:
   a filament chamber having a length extending through a unitary block of thermally conductive material and terminating in a nozzle aperture;
   a plurality of non-porous channels within the unitary block, each providing a closed path in proximity to the filament chamber so as to be thermally coupled to the filament chamber and the nozzle aperture by the thermally conductive material, and each of the non-porous channels adapted to support the circulation of a liquid coolant within the unitary block.

2. The extrusion nozzle manifold of claim 1 wherein at least one of the non-porous channels comprises a helical structure about the length of the filament chamber and nozzle aperture.

3. The extrusion nozzle manifold of claim 1 wherein the liquid coolant comprises propylene glycol.

4. The extrusion nozzle manifold of claim 1 wherein the thermally conductive material comprises a metal.

5. The extrusion nozzle manifold of claim 4 wherein the thermally conductive material comprises an aluminum alloy.

6. The extrusion nozzle manifold of claim 1 wherein the liquid coolant, after circulating through the unitary block, is passed through a heat exchanger.

7. The extrusion nozzle manifold of claim 1 wherein the unitary block is fabricated by means of a 3D printing process.

8. The extrusion nozzle manifold of claim 7 wherein the 3D printing process is direct metal laser sintering.

9. The extrusion nozzle manifold of claim 7 wherein at least one of the non-porous channels has an interior surface including surface variations, and wherein the surface variations increase the surface area of the at least one non-porous channel available to contact the liquid coolant.

10. The extrusion nozzle manifold of claim 9 wherein the surface variations are the result of unregulated variations in the 3D printing process.

11. A process for cooling an extrusion nozzle manifold comprising:
in a unitary block of thermally conductive material, comprising a filament chamber having a length extending through a unitary block of thermally conductive material and terminating in a nozzle aperture, and a plurality of non-porous channels within the unitary block, each non-porous channel providing a closed path in proximity to the filament chamber and nozzle aperture so as to be thermally coupled to the filament chamber and the nozzle aperture by the thermally conductive material;
circulating a liquid coolant within each of the non-porous channels;
passing the liquid coolant through a heat exchanger after it has been circulated through the non-porous channels so as to reduce the temperature of the liquid coolant; and
recirculating the reduced temperature liquid coolant through the non-porous channels.

12. The method of claim 11 wherein at least one of the non-porous channels comprises a helical structure about the length of the filament chamber and nozzle aperture.

13. The method of claim 11 wherein the liquid coolant comprises propylene glycol.

14. The method of claim 11 wherein the thermally conductive material comprises a metal.

15. The method of claim 14 wherein the thermally conductive material comprises an aluminum alloy.

16. The method of claim 11 wherein the unitary block is fabricated by means of a 3D printing process.

17. The method of claim 16 wherein the 3D printing process is direct metal laser sintering.

18. The method of claim 17 wherein at least one of the non-porous channels has an interior surface including surface variations, and wherein the surface variations increase the surface area of the at least one non-porous channel available to contact the liquid coolant.

19. The method of claim 18 wherein the surface variations are the result of unregulated variations in the 3D printing process.

* * * * *